United States Patent
Li et al.

(10) Patent No.: US 12,056,464 B2
(45) Date of Patent: Aug. 6, 2024

(54) LINEAR-FEEDBACK SHIFT REGISTER FOR GENERATING BOUNDED RANDOM NUMBERS

(71) Applicant: Micron Technology, Inc., Boise, ID (US)

(72) Inventors: Bo Li, Shanghai (CN); Jun Wu, Suzhou (CN)

(73) Assignee: Micron Technology, Inc., Boise, ID (US)

( * ) Notice: Subject to any disclaimer, the term of this patent is extended or adjusted under 35 U.S.C. 154(b) by 153 days.

(21) Appl. No.: 17/217,861

(22) Filed: Mar. 30, 2021

(65) Prior Publication Data

US 2022/0317975 A1   Oct. 6, 2022

(51) Int. Cl.
*G06F 7/58*   (2006.01)

(52) U.S. Cl.
CPC .................................... *G06F 7/584* (2013.01)

(58) Field of Classification Search
CPC .............. G06F 7/584; G06F 7/58–588
See application file for complete search history.

(56) References Cited

U.S. PATENT DOCUMENTS

| | | | | |
|---|---|---|---|---|
| 6,832,231 B1 * | 12/2004 | Jiang | ....................... | G06F 7/584 |
| | | | | 708/252 |
| 2003/0059045 A1 * | 3/2003 | Ruehle | ..................... | G06F 7/582 |
| | | | | 380/46 |
| 2005/0283507 A1 * | 12/2005 | Souvignier | ............... | G06F 1/02 |
| | | | | 708/250 |

FOREIGN PATENT DOCUMENTS

CN     108287682 B  *  9/2020  ............ G06F 7/584

OTHER PUBLICATIONS

C. Maxfield, 'Tutorial: Linear Feedback Shift Registers (LFSRs)—Part 1', Programmable Logic DesignLine, 2006 (retrieved from https://www.edn.com/tutorial-linear-feedback-shift-registers-lfsrs-part-1/). (Year: 2006).*

C. Maxfield, 'Tutorial: Linear Feedback Shift Registers (LFSRs)—Part 2', Programmable Logic DesignLine, 2006 (retrieved from https://www.edn.com/tutorial-linear-feedback-shift-registers-lfsrs-part-2/). (Year: 2006).*

(Continued)

*Primary Examiner* — Jyoti Mehta
*Assistant Examiner* — Vivian Diem Ha Ledynh
(74) *Attorney, Agent, or Firm* — Perkins Coie LLP

(57) ABSTRACT

Linear-feedback shift registers (LFSRs) for generating bounded random numbers (e.g., random numbers within a narrower range than those generated by a conventional LFSR of the same width) are described. In one embodiment, a bounded LFSR for generating an n-bit value comprises an m-bit LFSR with a range of $2^m$ random numbers and an n–m bit LFSR with a range of $2^{n-m}-1-k$ random numbers. The bounded LFSR further comprises logic to skip k values from a repeatable sequence of the n–m bit LFSR, which can, for example, be configured during the design of the bounded LFSR. The bounded LFSR provides bounded random numbers based on the outputs of the m-bit LFSR and the n–m bit LFSR. In one embodiment, the bounded random number generated by the bounded LFSR is used as a random address in a row hammer mitigation system.

16 Claims, 9 Drawing Sheets

(56) References Cited

OTHER PUBLICATIONS

C. Gressel, O. Dunkelman, and A. Hecht, 'Understanding the ZK Crypts-Ciphers for (Almost) all Reasons', eSTREAM: the eCRYPT Stream Cipher Project, 2007 (Year: 2007).*

S. Knapp, "Counter Examples" from The Programmable Gate Array Design Handbook, Xilinx, First Edition, 1986; retrieved from prevailing-technology.com (comment from author on the downloaded PDF when retrieved from website is from 2009) (Year: 2009).*

Y. Feng, Machine Translation of Feng (CN 108287682 B), 2020. (Year: 2020).*

W. Dally, EE108 Class Notes (Chapters 14-16), Stanford University's EE108A: Digital Systems I Course Notes, 2006, p. 235-299. Retrieved from Internet Archive from Snapshot on Apr. 21, 2015. (Year: 2015).*

* cited by examiner

LINEAR-FEEDBACK SHIFT REGISTER FOR GENERATING BOUNDED RANDOM NUMBERS

TECHNICAL FIELD

The present disclosure is related to a linear-feedback shift register for generating bounded random numbers.

BACKGROUND

A shift register is a type of digital circuit in which a set of flip-flops (or other state-storing devices) are arranged such that the output of one flip-flop drives the input of the next flip-flop. The flip-flops share a clock signal so that during each clock cycle, data shifts from one location to the next. A linear-feedback shift register (LFSR) is a class of shift register in which the input to the LFSR (e.g., the next value to be stored in the flip-flop representing the least significant bit of the LFSR) is a linear function of the LFSR state (e.g., derived from the present value stored in one or more flip-flops of the LFSR). That is, the LFSR value in a given clock cycle is a linear function of the LFSR value of the previous clock cycle. An LFSR with a well-chosen linear function will produce a sequence of values that appear random, and LFSRs are therefore commonly used as hardware random number generators.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted but rather are for explanation and understanding only.

DETAILED DESCRIPTION

Figure 1:
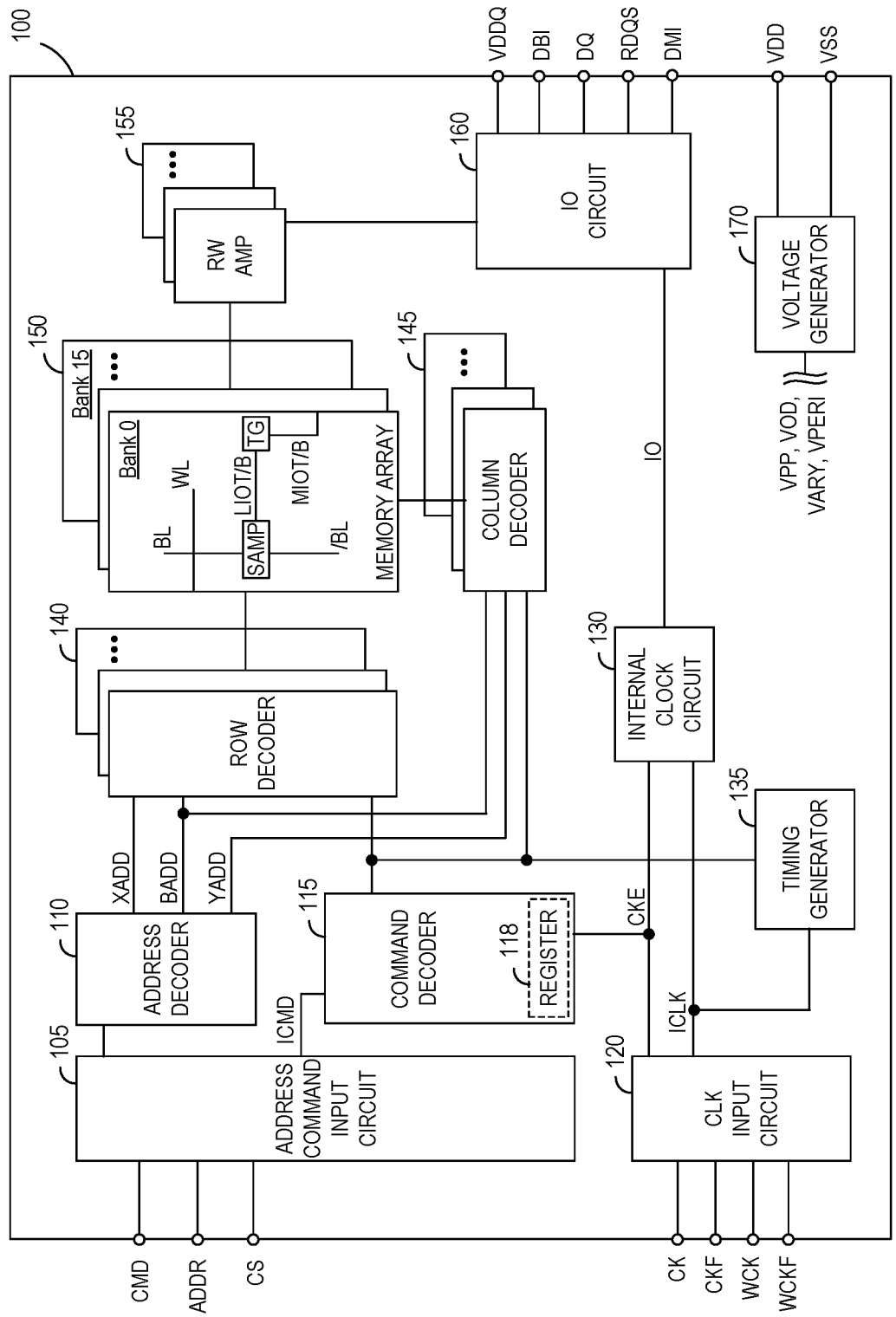
FIG. 1 is a block diagram schematically illustrating a memory device in accordance with embodiments of the present technology.

Linear-feedback shift register (LFSR) circuits are often used to generate pseudorandom numbers for various computing applications. LFSR outputs are pseudorandom in that the sequence of generated values is both deterministic and repeatable. That is, if the present state of the LFSR and its linear function are known, then the next value in the sequence can be determined. Additionally, the sequence of values that the LFSR generates will eventually repeat. Nonetheless, given a sufficiently large LFSR (i.e., a sufficient number of bits of storage form the LFSR) and a sufficiently long sequence of values before the LFSR repeats, the LFSR will appear to generate random numbers. For clarity, "pseudorandom" and "random" are used interchangeably herein to refer to LFSR outputs.

Conventional n-bit LFSRs (i.e., an LFSR formed from n flip-flops or other state-storing devices, where n is a positive integer) will cycle through $2^n-1$ possible values, in an apparently random sequence, before the sequence repeats. In some applications, however, certain values within the random maximum-length sequence of an LFSR are undesirable for the consumer of the LFSR output. For example, in an application in which an LFSR output is used to generate random addresses, where the largest valid address is less than $2^n$ but greater than $2^{n-1}$, certain LFSR outputs in the maximum sequence will be invalid. While there are some solutions to overcome this limitation of conventional LFSRs, they have various shortcomings. For example, a solution that sequences through multiple LFSR outputs until a valid (e.g., in range) output is obtained may violate the timing requirements of other circuits interfacing with the LFSR. It would therefore be desirable for an LFSR to be capable of producing less than the random maximum-length sequence.

Accordingly, several embodiments of the present technology are directed to an LFSR for generating bounded random numbers (herein a "bounded LFSR"), systems including a bounded LFSR, and associated methods. As described herein, the bounded LFSR is configured (e.g., during a circuit design process) to generate random numbers with a maximum value less than the maximum of an equivalently sized conventional LFSR (e.g., less than $2^n$). That is, the bounded LFSR has a "bounded" sequence that both (1) is shorter than a maximum-length sequence and 2) has a maximum value less than the maximum value of the maximum-length sequence of a conventional LFSR. In some embodiments, the bounded LFSR comprises an upper portion LFSR and a lower portion LFSR, which operate off of the same clock signals and whose outputs combine (e.g., are concatenated) to form the bounded LFSR output. For example, the bounded LFSR with n bits of state (herein an "n-bit bounded LFSR" or a "bounded LFSR[n-1:0]") can be composed of a lower portion LFSR with m bits of state and an upper portion LFSR with n-m bits of state (where n and m are positive integers, and n is greater than m such that n-m is a positive integer). In some embodiments, an m-bit lower portion LFSR is configured to have a sequence of $2^m$ values (i.e., from 0 to $2^m-1$). In some embodiments, an n-m bit upper portion LFSR is configured to have a sequence of $2^{n-m}-1-k$ values; as described herein, k reflects a configuration parameter of how many values in the upper portion LFSR sequence are omitted from the sequence (where k is a natural number or non-negative integer, and can be zero). As described herein, because the bounded LFSR generates a shorter sequence of values having a lower maximum value than a conventional LFSR sequence, the bounded LFSR generates an acceptable random number (e.g., within the valid range of a consumer of the bounded LFSR output) in a smaller number of LFSR clock cycles.

In some embodiments, the bounded LFSR is used in a memory device or system. For example, the bounded LFSR can be used to generate addresses for detecting and/or mitigating row hammer effects on a memory device. As a further example, the bounded LFSR can be used to generate seed addresses in a row hammer mitigation system. The ability to generate bounded random numbers is important in many applications in which time constraints are important, such as row hammer mitigation and other uses bound by memory device timing requirements.

FIG. 1 is a block diagram schematically illustrating a memory device 100 in accordance with embodiments of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Each word line of the plurality may be coupled with a corresponding word line driver (WL driver) configured to control a voltage of the word line during memory operations.

Memory cells can include any one of a number of different memory media types, including capacitive, phase change, magnetoresistive, ferroelectric, or the like. In some embodiments, a portion of the memory array 150 may be configured to store ECC parity bits (ECC check bits). The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, and VDDQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140 (which may be referred to as a row driver), and a decoded column address signal (YADD) to the column decoder 145 (which may be referred to as a column driver). The address decoder 110 can also receive the bank address portion of the ADDR input and supply the decoded bank address signal (BADD) and supply the bank address signal to both the row decoder 140 and the column decoder 145.

The command and address terminals may be supplied with command signals CMD, address signals ADDR, and chip select signals CS, from a memory controller. The command signals may represent various memory commands from the memory controller (e.g., refresh commands, activate commands, precharge commands, access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105.

The command decoder 115 may include circuits to decode the internal command signals ICMD to generate various internal signals and commands for performing memory operations, for example, a row command signal to select a word line and a column command signal to select a bit line. Other examples of memory operations that the memory device 100 may perform based on decoding the internal command signals ICMD includes a refresh command (e.g., re-establishing full charges stored in individual memory cells of the memory array 150), an activate command (e.g., activating a row in a particular bank, in some cases for subsequent access operations), or a precharge command (e.g., deactivating the activated row in the particular bank). The internal command signals can also include output and input activation commands, such as clocked command CMDCK (not shown in FIG. 1).

The command decoder 115, in some embodiments, may further include one or more registers 118 for tracking various counts and/or values (e.g., counts of refresh commands received by the memory device 100 or self-refresh operations performed by the memory device 100) and/or for storing various operating conditions for the memory device 100 to perform certain functions, features, and modes (or test modes). As such, in some embodiments, the registers 118 (or a subset of the registers 118) may be referred to as mode registers. Additionally, or alternatively, the memory device 100 may include registers 118 as a separate component out of the command decoder 115. In some embodiments, the registers 118 may include multi-purpose registers (MPRs) configured to write and/or read specialized data to and/or from the memory device 100.

When a read command is issued to a bank with an open row and a column address is timely supplied as part of the read command, read data can be read from memory cells in the memory array 150 designated by the row address (which may have been provided as part of the activate command identifying the open row) and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (e.g., the register 118). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (e.g., register 118). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command decoder 115.

For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

Memory devices such as the memory device 100 of FIG. 1 can be configured to detect and/or mitigate row hammer effects. The memory device 100 (e.g., in the row decoder 140) can, for example, include one or more bounded LFSRs to produce a random sample signal. The memory device 100 can use the random sample signal to sample row addresses which will be used to detect and/or mitigate row hammer effects.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

Figure 2:
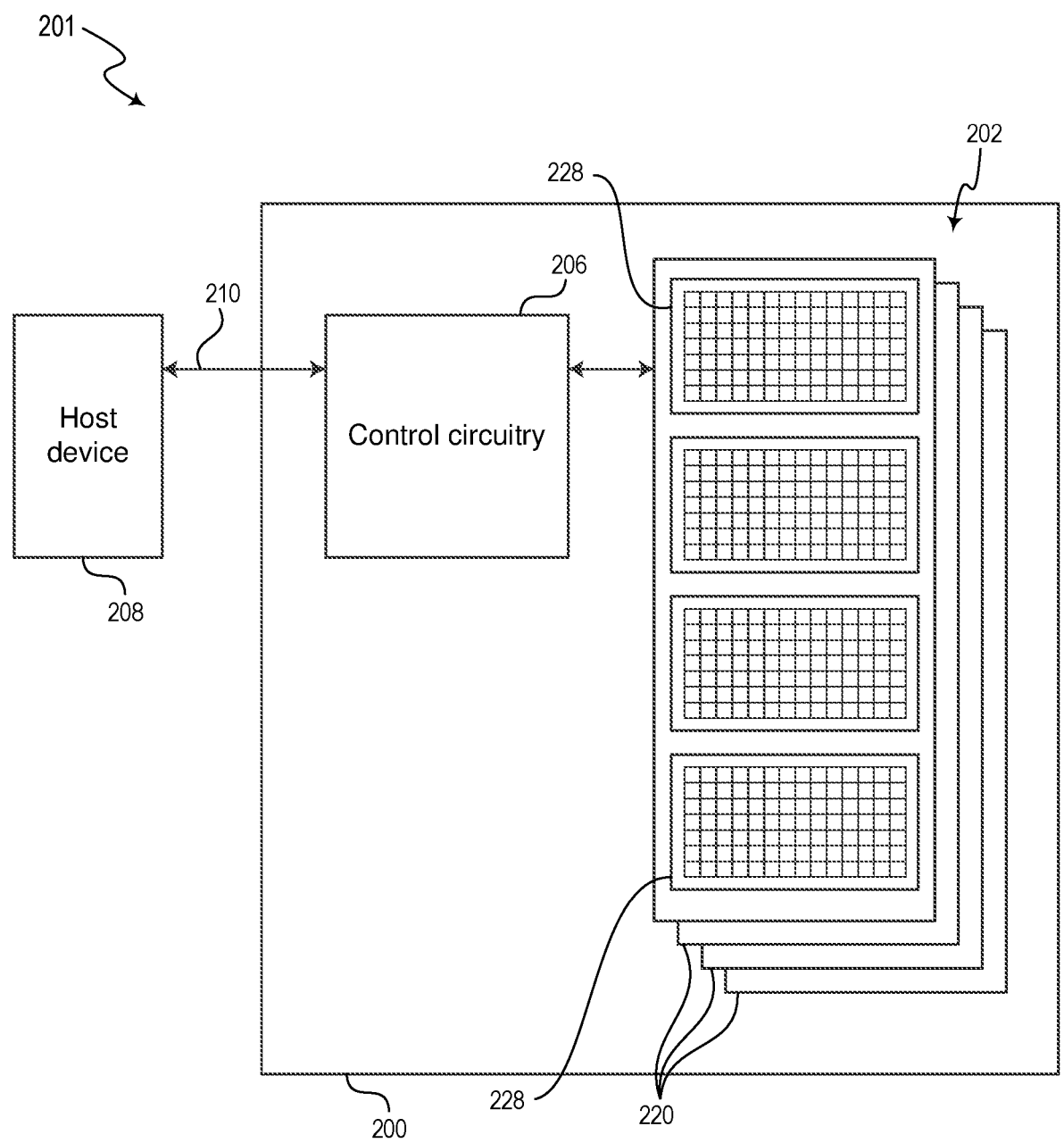
FIG. 2 is a block diagram of a system having a memory device configured in accordance with embodiments of the present technology.

FIG. 2 is a block diagram of a system 201 having a memory device 200 configured in accordance with embodiments of the present technology. The memory device 200 may be an example of or include aspects of the memory device described with reference to FIG. 1. As shown, the memory device 200 includes a main memory 202 (e.g., DRAM, NAND flash, NOR flash, FeRAM, PCM, etc.) and control circuitry 206 operably coupled to a host device 208 (e.g., an upstream central processor (CPU), a memory controller). The control circuitry 206 may include aspects of various components described with reference to FIG. 1. For example, the control circuitry 206 may include aspects of the command/address input circuit 105, the address decoder 110, and the command decoder 115, among others.

The main memory 202 includes a plurality of memory units 220, which each include a plurality of memory cells. The memory units 220 can be individual memory dies, memory planes in a single memory die, a stack of memory dies vertically connected with through-silicon vias (TSVs), or the like. For example, in one embodiment, each of the memory units 220 can be formed from a semiconductor die and arranged with other memory unit dies in a single device package. In other embodiments, multiple memory units 220 can be co-located on a single die and/or distributed across multiple device packages. The memory units 220 may, in some embodiments, also be sub-divided into memory regions 228 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 202 and/or the individual memory units 220 can also include other circuit components, such as multiplexers, decoders, buffers, read/write drivers, address registers, data out/data in registers, etc., for accessing and/or programming (e.g., writing) the memory cells and other function, such as for processing information and/or communicating with the control circuitry 206 or the host device 208. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 200 can include only one memory unit 220. Alternatively, the memory device 200 can include two, three, four, eight, ten, or more (e.g., 16, 32, 64, or more) memory units 220. Although the memory units 220 are shown in FIG. 2 as including four memory regions 228 each, in other embodiments, each memory unit 220 can include one, two, three, eight, or more (e.g., 16, 32, 64, 100, 128, 256, or more) memory regions.

In one embodiment, the control circuitry 206 can be provided on the same die as the main memory 202 (e.g., including command/address/clock input circuitry, decoders, voltage and timing generators, input/output circuitry, etc.). In another embodiment, the control circuitry 206 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 206 can include a processor configured to execute instructions stored in memory to perform various processes, logic flows, and routines for controlling operation of the memory device 200, including managing the main memory 202 and handling communications between the memory device 200 and the host device 208. In some embodiments, the control circuitry 206 can include embedded memory with memory registers for storing, e.g., memory addresses, row counters, bank counters, memory pointers, fetched data, etc. In another embodiment of the present technology, a memory device 200 may not include control circuitry, and may instead rely upon external control (e.g., provided by the host device 208, or by a processor or controller separate from the memory device 200).

The host device 208 can be any one of a number of electronic devices capable of utilizing memory for the temporary or persistent storage of information, or a component thereof. For example, the host device 208 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 208 may be a networking device (e.g., a switch, a router, etc.) or a recorder of digital images, audio and/or video, a vehicle, an appliance, a toy, or any one of a number of other products. In one embodiment, the host device 208 may be connected directly to memory device 200, although in other embodiments, the host device 208 may be indirectly connected to memory device (e.g., over a networked connection or through intermediary devices).

In operation, the control circuitry 206 can directly write or otherwise program (e.g., erase) the various memory regions of the main memory 202. The control circuitry 206 communicates with the host device 208 over a host-device bus or interface 210. In some embodiments, the host device 208 and the control circuitry 206 can communicate over a dedicated memory bus (e.g., a DRAM bus). In other embodiments, the host device 208 and the control circuitry 206 can communicate over a serial interface, such as a serial attached SCSI (SAS), a serial AT attachment (SATA) interface, a peripheral component interconnect express (PCIe), or other suitable interface (e.g., a parallel interface). The host device 208 can send various requests (in the form of, e.g., a packet or stream of packets) to the control circuitry 206. A request can include a command to read, write, erase, return information, and/or to perform a particular operation (e.g., a refresh operation, a TRIM operation, a precharge operation, an activate operation, a wear-leveling operation, a garbage collection operation, etc.).

Figure 3:
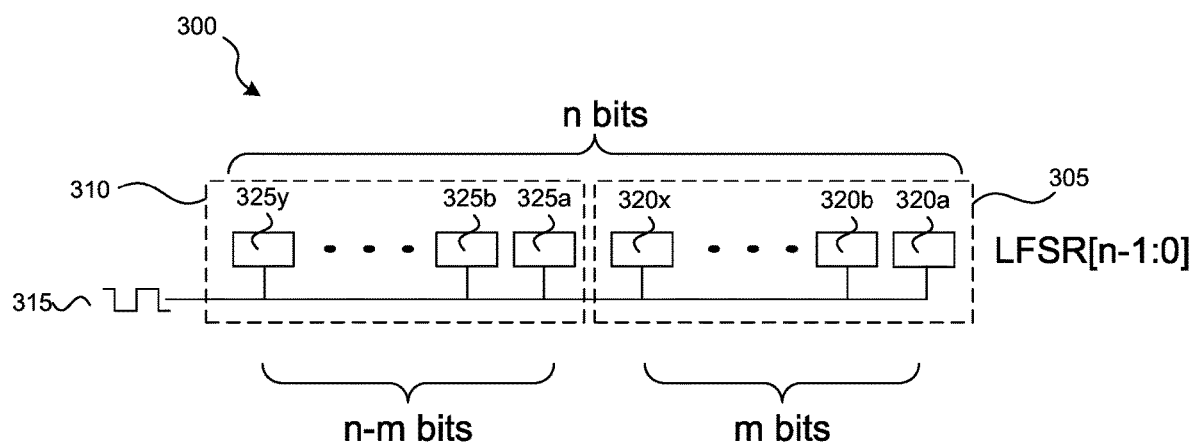
FIG. 3 is a simplified block diagram schematically illustrating an LFSR for generating bounded random numbers in accordance with embodiments of the present technology.

FIG. 3 is a simplified block diagram schematically illustrating a bounded LFSR 300 configured in accordance with embodiments of the present technology. As illustrated in FIG. 3, the bounded LFSR 300 is n bits wide, corresponding to bits 0 through n−1 (i.e., [n−1:0]). The bounded LFSR 300 comprises two LFSRs, a lower portion LFSR 305 and an upper portion LFSR 310. As described herein, the lower portion LFSR 305 and the upper portion LFSR 310 can each include separate circuitry (e.g., flip-flops or other state-storing devices and/or logic gates to implement the linear function or other sequence-generating features) such that each generates a distinct sequence of values. That is, the lower portion LFSR 305 follows a lower portion sequence, and the upper portion LFSR 310 follows an upper portion sequence. However, the lower portion LFSR 305 and upper portion LFSR 310 can share a clock signal 315 so that both update their values at the same time. In embodiments of the disclosed technology, the lower portion LFSR 305 and upper portion LFSR 310 do not share data; that is, in said embodiments, outputs of the lower portion LFSR 305 do not act as inputs to the linear function of the upper portion LFSR 310. The output of the bounded LFSR 300 is based on the outputs of the lower portion LFSR 305 and the upper portion LFSR 310. That is, for example, the lower bits of the bounded LFSR 300 output can be driven by the lower portion LFSR 305, and the upper bits of the bounded LFSR 300 output can be driven by the upper portion LFSR 310.

As illustrated in FIG. 3, the lower portion LFSR 305 is m bits wide, corresponding to bits 0 through m−1 of the bounded LFSR 300 output (i.e., [m−1:0]). Accordingly, the lower portion LFSR 305 can include m flip-flops 320a, 320b, and so on (depending on m) to 320x. The lower portion LFSR 305 can also include logic (not shown) to generate the lower portion sequence. As described herein, the lower portion sequence can be configured to facilitate the generation of bounded random numbers by the bounded LFSR 300. For example, in accordance with embodiments of the present technology, the lower portion sequence of the m-bit lower portion LFSR 305 sequences through $2^m$ possible values. It will be appreciated that, in contrast, a conventional m-bit LFSR sequences through $2^m-1$ possible values since a particular value (such as the value represented by all 0s or all 1s) may be impermissible because applying the linear function of the LFSR to that value results in the LFSR value never changing.

As further illustrated in FIG. 3, the upper portion LFSR 310 is n−m bits wide, corresponding to bits m through n−1 of the bounded LFSR 300 output (i.e., [n−1:m]). Accordingly, the upper portion LFSR 310 can include n−m flip-flops 325$a$, 325$b$, and so on (depending on n−m) to 325$y$. The upper portion LFSR 310 can also include logic (not shown) to generate the upper portion sequence. As described herein, the upper portion sequence can be configured to facilitate the generation of bounded random numbers by the bounded LFSR 300. For example, in accordance with embodiments of the present technology, the upper portion sequence of the n−m-bit upper portion LFSR 310 sequences through $2^{n-m}-1-k$ possible values. k reflects the number of values skipped in the upper portion sequence and can be set (using the logic of the upper portion LFSR 310) based on design requirements (e.g., how bounded the random numbers generated by the bounded LFSR 300 should be, according to the requirements of the consumer of the random numbers). In some embodiments of the present technology, k is 0 (i.e., no values are skipped in the upper portion sequence). In some embodiments of the present technology, k is any value so long as the value of k does not result in any common divisors between $2^m$ and $2^{n-m}-1-k$.

The n-bit bounded LFSR 300, formed from the m-bit lower portion LFSR 305 and the n−m-bit upper portion LFSR 310, has a sequence range of $(2^{n-m}-1-k) \times 2^m$. In contrast, conventional n-bit LFSRs have a sequence range of $2^n-1$ possible values (the maximum-length sequence of the n-bit LFSR is $2^n-1$ possible values, instead of $2^n$ possible values, since a particular value will result in no change in value when the linear function is applied to it, and therefore is impermissible since it would result in the LFSR value never changing). In other words, the bounded LFSR 300 sequences through a shorter sequence than an equivalently sized conventional LFSR of the same width (i.e., the same number of flip-flops or other state-storing devices). Furthermore, the sequence of the bounded LFSR 300 has a lower upper bound than a conventional LFSR (that is, the bounded LFSR skips the largest numbers that would be generated by a conventional LFSR). The bounded LFSR 300 can therefore generate a random number in-range for a consumer (e.g., a downstream circuit) faster than a conventional LFSR, which in contrast may require the consumer to skip or sequence through multiple conventional LFSR outputs over several clock cycles before an in-range value is generated.

For example, a circuit (e.g., circuitry to mitigate or detect row hammer effects) could require random numbers less than or equal to the value 150. A conventional 8-bit LFSR sequences through 255 values (e.g., 0-254 or 1-255), many of which exceed the threshold value of the consuming circuit (i.e., are greater than 150). Furthermore, LFSR values exceeding the consuming circuit threshold can occur consecutively in sequence, such that the consuming circuit needs to iterate through multiple LFSR outputs in order to obtain a next value under the threshold. For example, the conventional LFSR could generate 6 consecutive values exceeding the threshold, requiring the consuming circuit to wait up to 7 LFSR clock cycles for a next valid random number, which can pose considerable timing challenges. That is, it could be a timing requirement of the consuming circuit that a new random number needs to be available at least every 3 clock cycles. In contrast, an 8-bit bounded LFSR, configured in accordance with the representative bounded LFSR 300, can be configured to generate a random number in fewer clock cycles. For example, an 8-bit bounded LFSR with a 4-bit lower portion LFSR and a 4-bit upper portion LFSR and a k value of 2 (i.e., 2 additional values skipped in the upper portion sequence) can generate a random number at least every 3rd clock cycle of the bounded LFSR. That is, the 8-bit bounded LFSR can be configured to generate at most 2 consecutive values exceeding the threshold, thereby satisfying the timing requirements of the consuming circuit. It will be appreciated that the bounded LFSR can be designed differently (e.g., different values of n, m, and k) depending on the requirements of the consuming circuits (e.g., what range of random numbers is required, how many LFSR clock cycles until the next valid output can be tolerated, etc.).

Figure 4:
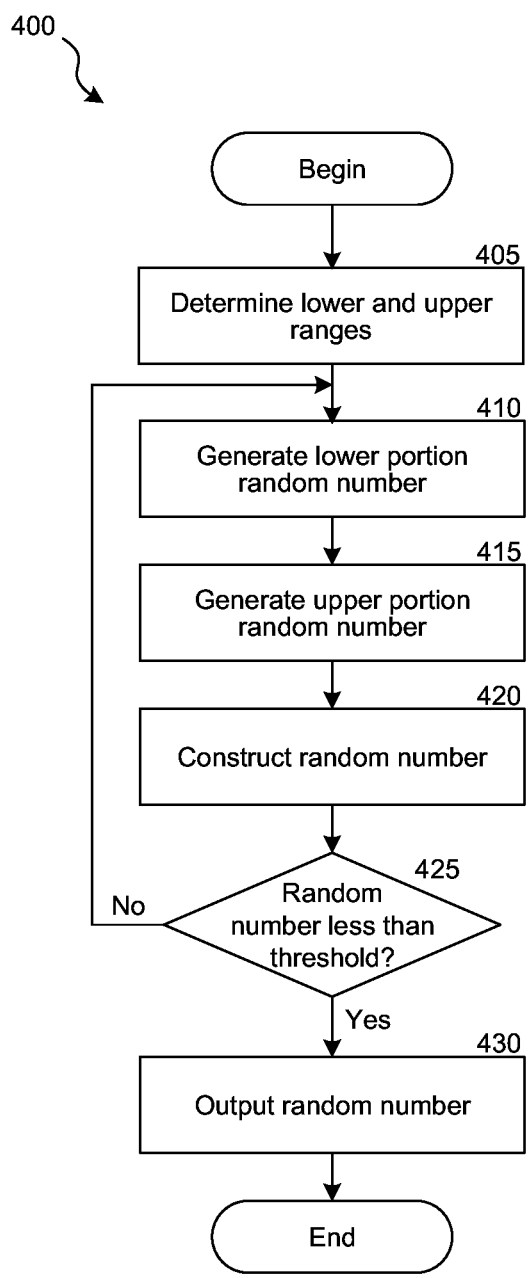
FIG. 4 is a flow diagram illustrating a process for generating bounded random numbers in accordance with embodiments of the present technology.

FIG. 4 is a flow diagram illustrating a process 400 for generating bounded random numbers in accordance with embodiments of the present technology. The process 400 can be performed, for example, to generate a random number for a consuming circuit (e.g., hardware circuitry to detect or mitigate row hammer effects). In accordance with some embodiments of the disclosed technology, the consuming circuit can require random numbers not to exceed a threshold based on the requirements of the consuming circuit (e.g., for a consuming circuit that utilizes the random numbers as random addresses, that the random numbers not exceed an address limit). Aspects of the process 400 can be implemented, for example, in hardware circuitry using a bounded LFSR as described herein and/or additional circuitry (e.g., the consuming circuit or circuitry that interfaces between the bounded LFSR and the consuming circuit).

The process 400 begins at block 405, where the process determines a lower portion range and an upper portion range. As described herein, the lower portion range and the upper portion range specify the range of values from which the process may generate a lower portion random number and an upper portion random number, respectively. Generation of the lower portion random number and upper portion random number are described further below with references to blocks 410 and 415 of the process 400. The lower portion range can be of the form $2^m$, where m is based in part on the maximum allowable value (i.e., threshold) of the random number to be generated by the process 400. For example, when m is 2, the lower portion range is 4, when m is 4, the lower portion range is 16; when m is 6, the lower portion range is 64, etc. The upper portion range can be of the form $2^{n-m}-1-k$, where n and k are based in part on the maximum allowable value (i.e., threshold) of the random number to be generated by the process 400, and m corresponds to the lower portion range. In accordance with embodiments of the disclosed technology, n is such that $2^n$ is greater than the largest random number desired. For example, if random numbers from 0 to 8 are desired, n can be 4. As a further example, if random numbers from 0 to 150 are desired, n can be 8. In accordance with embodiments of the disclosed technology, n is greater than m (that is, n−m is a positive value). In accordance with embodiments of the disclosed technology, k can be any value that does not result in common divisors between $2^m$ and $2^{n-m}-1-k$. In embodiments of the disclosed technology, k can be zero. In some embodiments, the determination of the lower portion range and the upper portion range can occur contemporaneously or nearly contemporaneously with the generation of a random number (e.g., using an FPGA or other reconfigurable or reprogrammable capabilities). In some embodiments, the determination of the lower portion range and the upper portion range can occur in advance of the generation of a random number (e.g., during the design of a bounded LFSR circuit).

At block 410, the process 400 generates a lower portion random number based on the lower portion range. For example, if the lower portion range is 16, the process 400 can generate a lower portion random number between 0 and 15 (inclusive); if the lower portion range is 128, the process can generate a lower portion random number between 0 and 127 (inclusive), etc.

At block 415, the process 400 generates an upper portion random number based on the upper portion range. For example, if the upper portion range is 15, the process 400 can generate an upper portion random number between 0 and 14 (inclusive).

At block 420, the process 400 constructs a random number based on the lower portion random number and the upper portion random number. In some embodiments of the disclosed technology, the lower bits of the random number are based on the lower portion random number and the upper bits of the random number are based on the upper portion random number. That is, the random number can be a binary concatenation of the upper portion random number and lower portion random number (e.g., {upper portion random number, lower portion random number}). For example, if the upper portion random number is 2 (corresponding to binary "10" or "2'b10") and the lower portion random number is 3 (corresponding to binary "11" or "3'b11"), the constructed random number would be 11 (corresponding to binary "1011" or "4'b1011")). As a further example, if both the upper portion random number and the lower portion random number are 2 (corresponding to binary "10" or "2'b10")), the constructed random number would be 10 (corresponding to binary "1010" or "4'b1011").

At decision block 425, the process 400 determines whether the constructed random number is less than the threshold (i.e., does not exceed the maximum allowed value). If the constructed random number exceeds the threshold, the process 400 returns to block 410 to generate a new random number. If the constructed random number does not exceed a threshold, the process 400 continues to block 430.

At block 430, the process 400 outputs the constructed random number. In some embodiments, the process 400 drives one or more data signals (e.g., over a bus, at an interface between circuits, etc.) based on the value of the constructed random number. In some embodiments, the process 400 drives a valid signal or similar to indicate to a consumer that the output random number satisfies a threshold or maximum value constraint. The process 400 then ends.

Figure 5:
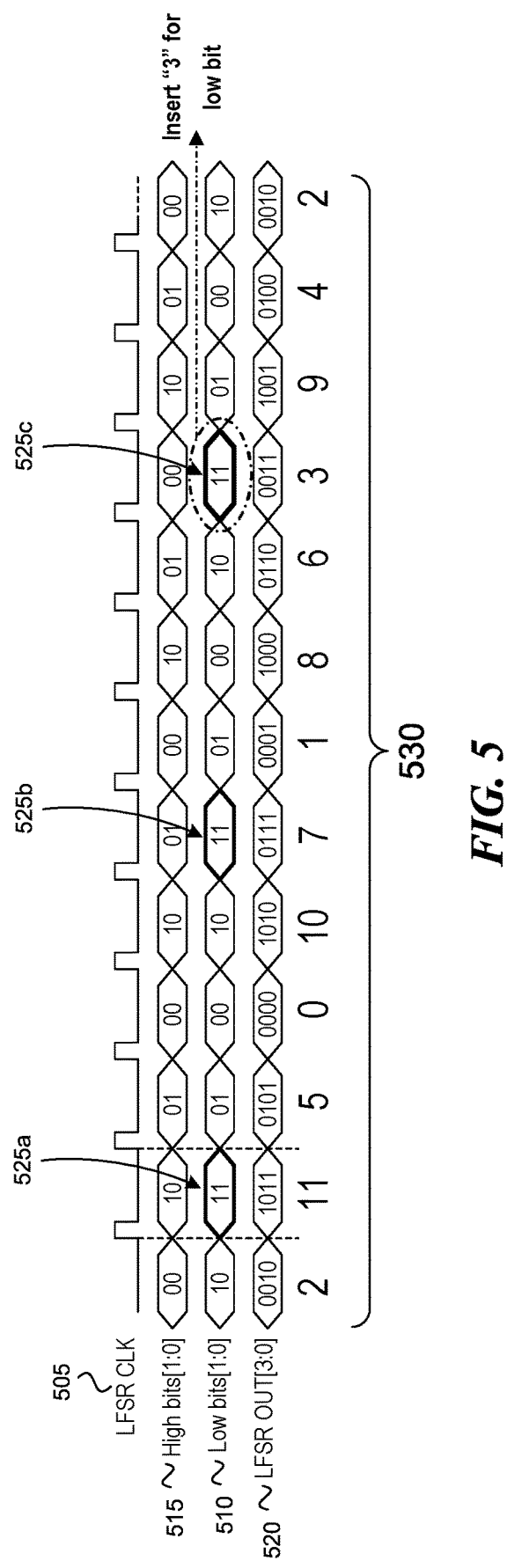
FIG. 5 is a timing diagram illustrating bounded random numbers generated in accordance with embodiments of the present technology.

FIG. 5 is a timing diagram illustrating bounded random numbers generated in accordance with embodiments of the present technology. In particular, FIG. 5 illustrates an example of generating 4-bit bounded random numbers 520 in each clock cycle, as controlled by a clock signal 505. The 4-bit bounded random numbers are based on a low bits value 510 and a high bits value 515, both of which are 2 bits in width and are updated according to the clock signal 505. Each of the low bits value 510 and the high bits value 515 can follow a repeating sequence (e.g., a low bits sequence and a high bits sequence, respectively), for example as derived from linear functions and/or other logic of shift registers. For example, as illustrated in FIG. 5, high bits value 515 sequences through values 2'b00, 2'b10, and 2'b01 over three clock cycles before repeating again. Furthermore, the illustrated high bits value 515 does not take on the value 2'b11, since in the representative example of FIG. 5, that value is not part of the high bits sequence (e.g., applying the high bits linear function to the value 2'b11 would result in generating the same 2'b11 value in the next clock cycle, such that the high bits value does not change from one cycle to the next). In contrast, as illustrated in FIG. 5, low bits value 510 sequences through values 2'b10, 2'b11, 2'b01, and 2'b00 over four clock cycles before repeating again. That is, the low bits sequence includes the value 2'b11 (absent from the high bits sequence) at cycles 525a, 525b, and 525c, as configured by a linear function and/or other logic generating the low bits sequence. The low bits value 510 and high bits value 515, both of which are 2 bits, combine to form the 4-bit bounded random number 520. That is, as illustrated in FIG. 5, bits 0 and 1 of the bounded random number 520 correspond to the low bits value 510, and bits 2 and 3 of the bounded random number 520 correspond to the high bits value 515.

The bounded random numbers 520 follow a sequence 530. In the illustrative example of FIG. 5, the sequence 530 is 12 numbers long (e.g., the sequence runs 2, 11, 5, 0, 10, 7, 1, 8, 6, 3, 9, and 4 before repeating). In contrast, a conventionally generated 4-bit random number sequence is 15 numbers long (e.g., a sequence could run 2, 6, 14, 13, 11, 7, 12, 9, 3, 4, 10, 5, 8, 1, and 0 before repeating) and contains larger numbers. If, for example, a consumer of the bounded random numbers 520 shown in sequence 530 required a random number less than 9, only three values in the sequence (9, 10, and 11) would need to be skipped, taking at most one additional cycle of clock signal 505. In contrast, if the same consumer utilized the values from the example conventionally generated 4-bit random number sequence, six values in the sequence (9, 10, 11, 12, 13, and 14) would need to be skipped, and the consumer could need to wait up to three additional cycles of clock signal 505 before the next random number within range (e.g., after 6 in the sequence, values 14, 13, and 11 are skipped before the sequence generates the value 7).

Figure 6A:
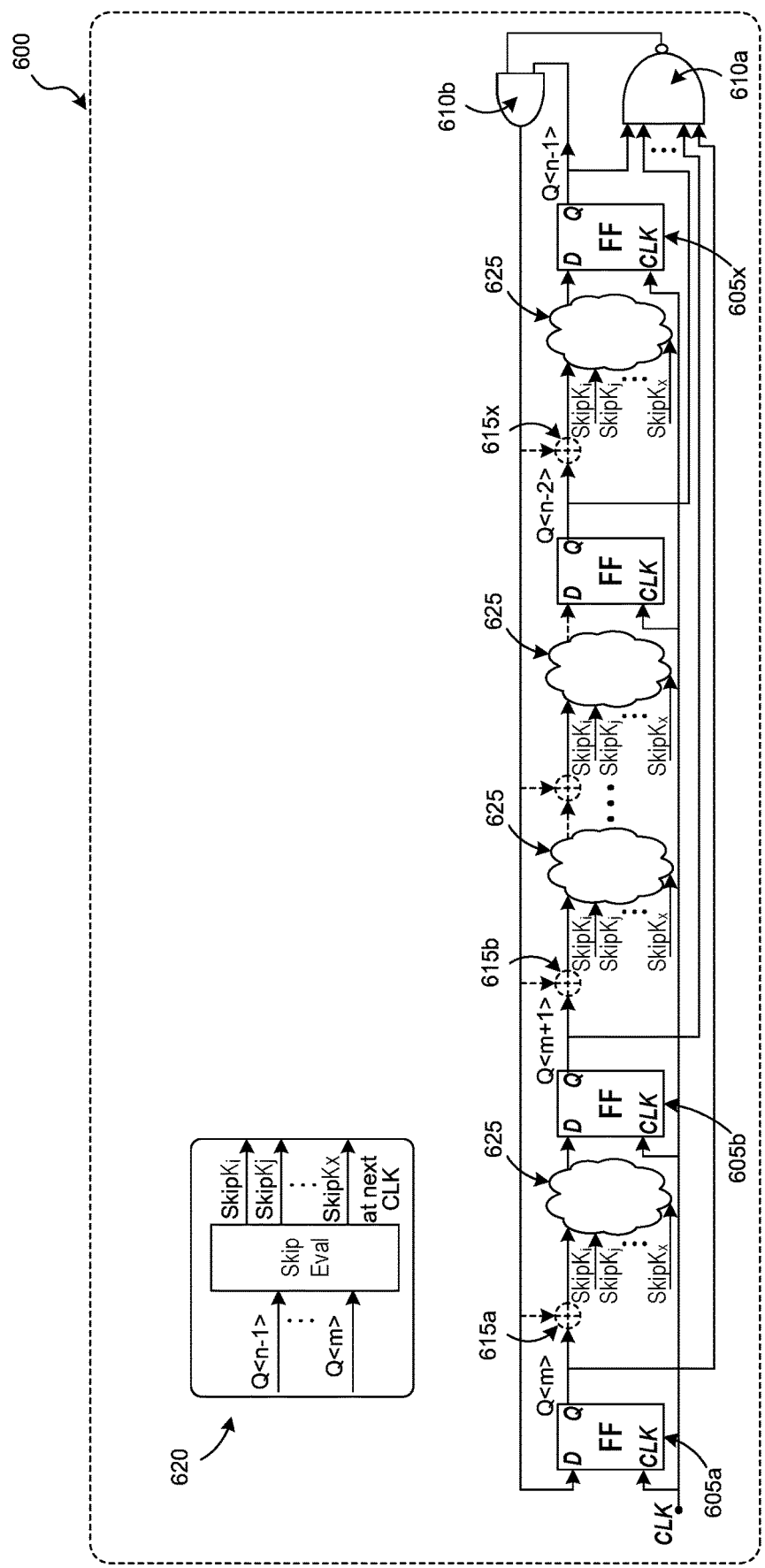
FIG. 6A is a simplified schematic diagram illustrating an upper portion of an LFSR for generating bounded random numbers in accordance with embodiments of the present technology.

FIG. 6A is a simplified schematic diagram illustrating an upper portion 600 of an LFSR for generating bounded random numbers in accordance with embodiments of the present technology. The upper portion 600 can be used, for example, to generate the upper (e.g., most significant) bits of a bounded LFSR. As illustrated in the embodiment shown in FIG. 6A, for example, for an n-bit bounded LFSR (corresponding to bit range 0 to n−1), the upper portion 600 generates the most significant n-m bits of the bounded LFSR (where, as described herein, m describes the width of a lower portion of the bounded LFSR), corresponding to bits m through n−1 of the bounded LFSR value. Accordingly, the upper portion 600 includes n−m flip-flops, identified as flip-flops 605a, 605b, and so on (depending on n−m) to 605x.

The upper portion 600 includes logic gates 610a and 610b and taps 615a, 615b, and so on through 615x, based on which the linear function of the upper portion is implemented. That is, the logic gates 610a and 610b, and taps 615a-615x, determine in part the next state of the upper portion 600 from the current state of the upper portion. The taps 615a-615x correspond to the bit positions at which the output of a flip-flop undergoes a logical operation before being stored in the next flip-flop at the next cycle. In the embodiment illustrated in FIG. 6A, each tap performs an exclusive-or (XOR) of the previous flip-flop output with the output of logic gate 610a; however, other logical operations using other input values can be used. Although the embodiment illustrated in FIG. 6A shows taps 615a-615x corresponding to the input of each bit position in the upper portion 600, in other embodiments taps can be omitted from certain bit positions based on the desired linear function. Bits that are not taps are shifted from one flip-flop to the next flip-flop unchanged.

In some embodiments of the disclosed technology, the upper portion 600 includes logic for skipping values within the sequence generated by the linear function. Whereas in a conventional LFSR unwanted values in a sequence are sequenced through over the course of multiple cycles (i.e., by clocking the LFSR so that it updates its value per its linear function), the logic in the upper portion 600 for skipping values enables multiple values to be skipped within a cycle. That is, rather than clocking a conventional LFSR multiple times to get to the next desired value, the upper portion 600 can entirely omit those values from the sequence, thereby reducing or eliminating the clock cycle penalty. Accordingly, the upper portion 600 can include skip logic 620, which evaluates the current value of the upper portion 600 (i.e., the value in flip-flops 605a-605x) and determines whether the next value in the linear function sequence is one that should be skipped. When the skip logic 620 determines that the next value in the linear function sequence should be skipped, the skip logic 620 generates a jump value that the upper portion 600 will be updated to in the next cycle, in place of the next sequence value being generated by the linear function. Because the generated sequence of values is deterministic (i.e., the same value always follows a given value in sequence), the skip logic 620 can be configured to skip selected values (e.g., values exceeding a threshold) and jump to the next allowed value in the sequence (e.g., values within the threshold). The skip logic 620 can also be configured to initiate multiple different skips within a sequence as well as to skip over multiple values in the sequence. For example, in a linear function sequence that includes the sequence (8, 14, 3, 13, and 7), the upper portion 600 can skip over values larger than 12 by configuring the skip logic 620 to detect the condition to skip the value 14 when the current value is 8 by jumping to 3, and to detect the condition to skip the value 13 when the current value is 3 by jumping to 7). As a further example, in a linear function sequence that includes the sequence (8, 14, 13, and 2), the upper portion 600 can skip over values larger than 12 by configuring the skip logic 620 to detect the condition to skip the values 14 and 13 when the current value is 8 by jumping to 2. In some embodiments, the skip logic 620 can be configured to skip no values (i.e., the upper portion 600 follows the linear function logic). In some embodiments, the skip logic 620 can be configured to skip any number of values within the sequence of upper portion 600. In some embodiments, the skip logic 620 can be configured to skip any number of values so long as it does not result in a common divisor between $2^m$ (i.e., the range of a lower portion of a bounded LFSR) and $2^{n-m}-1$-the number of values skipped (i.e., the range of the upper portion 600). In embodiments of the disclosed technology, the skip logic 620 is coupled in combination with additional logic 625 to the data inputs and/or set/reset inputs of the flip-flops 605a-605x. Additionally, the skip logic 620 and the additional logic 625 can drive different values to each flip-flop (e.g., based on generated jump values). If the skip logic 620 does not detect a skip condition, and no jump value is generated, the skip logic 620 and the additional logic 625 can have no effect such that the flip-flops 605a-605x take on the value from the linear function logic (e.g., the next occurring value in the sequence). It will be appreciated that the configuration of the skip logic 620 enables the flip-flops 605a-605x to take on any jump value when a value to be skipped is detected, thereby effectively skipping over one or more values in a sequence within a single clock cycle.

Figure 6B:
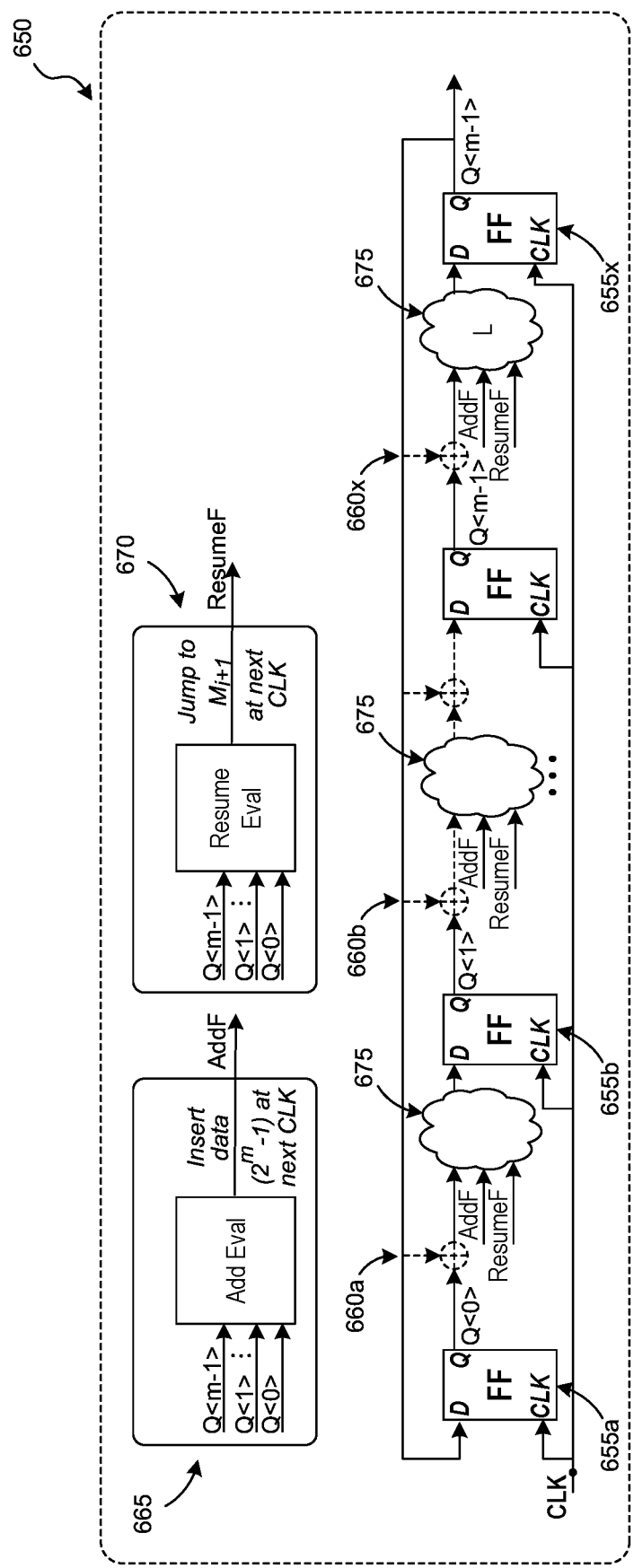
FIG. 6B is a simplified schematic diagram illustrating a lower portion of an LFSR for generating bounded random numbers in accordance with embodiments of the present technology.

FIG. 6B is a simplified schematic diagram illustrating a lower portion 650 of an LFSR for generating bounded random numbers in accordance with embodiments of the present technology. The lower portion 650 can be used, for example, to generate the lower (e.g., least significant) bits of a bounded LFSR. As illustrated in the embodiment shown in FIG. 6B, for example, for an n-bit bounded LFSR (corresponding to bit range 0 to n−1), the lower portion 650 generates the least significant m bits of the bounded LFSR, corresponding to bits 0 through m−1 of the bounded LFSR value. Accordingly, the lower portion 650 includes m flip-flops, identified as flip-flops 655a, 655b, and so on (depending on m) to 655x.

The lower portion 650 includes taps 660a, 660b, and so on through 660x, based on which the linear function of the lower portion is implemented. That is, the taps 660a-660x determine in part the next state of the lower portion 650 from the current state of the lower portion 650. The taps 660a-660x correspond to the bit positions at which the output of a flip-flop undergoes a logical operation before being stored in the next flip-flop at the next cycle. In the embodiment illustrated in FIG. 6B, each tap performs an XOR of the previous flip-flop output with the output of the most significant flip-flop of the lower portion 650 (i.e., flip-flop 655x, corresponding to bit position m−1). In embodiments of the disclosed technology, other logical operations using other input values can be used for the taps. Although the embodiment illustrated in FIG. 6B shows taps 660a-660x corresponding to the input of each bit position in the lower portion 650, in other embodiments taps can be omitted from certain bit positions based on the desired linear function. Bits that are not taps are shifted from one flip-flop to the next flip-flop unchanged.

In some embodiments of the disclosed technology, the lower portion 650 includes logic for including an additional value within the sequence generated by the linear function. Whereas the linear function of a conventional m-bit LFSR typically generates a sequence of $2^m-1$ values (e.g., from 0 to $2^m-2$), the logic in the lower portion 650 for including an additional value (e.g., the value $2^m-1$) extends the sequence to include $2^m$ values. Doing so enables the lower portion 650 to be used in combination with additional circuitry, such as the upper portion 600 described in FIG. 6A, to generate bounded random numbers. Accordingly, the lower portion 650 can include add logic 665 and resume logic 670. The add logic 665 evaluates the current value of the lower portion 650 (i.e., the value in the flip-flops 655a-655x) and determines whether the lower portion 650 should take on an additional value, outside of the linear function-generated sequence, in the next clock cycle. The add logic 665 can additionally generate the additional value. In embodiments of the disclosed technology, the add logic 665 generates the value corresponding to $2^m-1$ (that is, based on the width of the lower portion 650). The resume logic 670 evaluates the current value of the lower portion 650 and determines whether the current value is the additional value. When the resume logic 670 determines that the current value is the additional value, it generates a resume value for the lower portion 650 to take in the next clock cycle. In embodiments of the disclosed technology, the resume value corresponds to the value in the linear function-generated sequence that ordinarily follows the value detected by the add logic 665. In other words, the add logic 665 and the resume logic 670 operate in combination to introduce an additional value into a sequence and then resume the sequence from where the additional value was introduced. Because the generated sequence of values is deterministic, the add logic 665 and the resume logic 670 can be configured to add the additional value to any location in the sequence. For example, the linear function sequence of a 3-bit lower portion 650 could be repeating sequence (1, 0, 2, 6, 5, 3, 4). The add logic 665 can be configured to add the value 7 after detecting the value 6, and the resume logic 670 can be configured to resume with the value 5 after detecting the value 6, thereby generating the repeating sequence (1, 0, 2, 6, 7, 5, 3, 4). In embodiments of the disclosed technology, the add logic 665 and the resume logic 670 are coupled in combination with additional logic 675 to the data inputs and/or set/reset inputs of the flip-flops 655a-655x. Additionally, the add logic 665, the resume logic 670, and the additional logic 675 can drive different values to each flip-flop (e.g., based on the generated additional value or resume value). If the add logic 665 and the resume logic 670 do not detect an add or resume condition, such that no additional value or resume value is generated, the add logic and resume logic can have no effect such that the flip-flops 655a-655x take on the value from the linear function logic (e.g., the next occurring value in the sequence).

Figure 7:
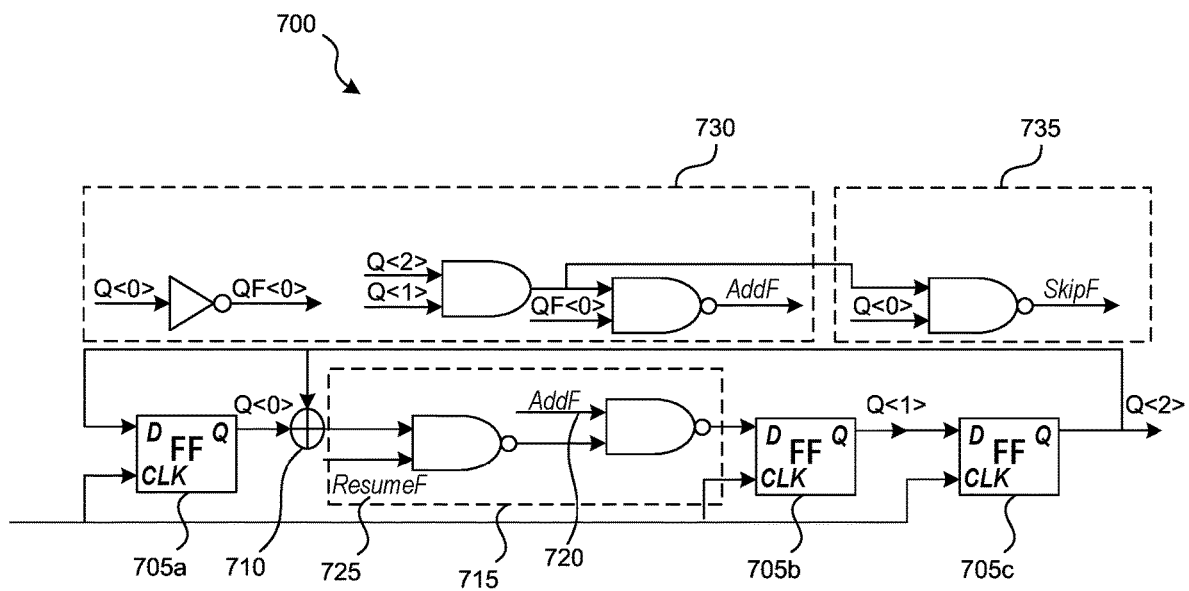
FIG. 7 is a schematic diagram illustrating an implementation of an LFSR lower portion for generating bounded random numbers in accordance with embodiments of the present technology.

FIG. 7 is a schematic diagram illustrating an implementation of an LFSR lower portion 700 for generating bounded random numbers in accordance with embodiments of the present technology. As illustrated in FIG. 7, the LFSR lower portion 700 is 3 bits wide, which may correspond to the least significant 3 bits of a larger bounded LFSR (4 or more bits). Accordingly, the LFSR lower portion 700 includes flip-flops 705a-705c (corresponding to bits 0 through 2, respectively). The input to the flip-flop 705c is driven by the unmodified output of the flip-flop 705b, and the input to the flip-flop 705a is driven by the unmodified output of the flip-flop 705c. The input to the flip-flop 705b is generated from a combination of an XOR tap 710 of outputs from the flip-flops 705a and 705c and additional logic 715. The additional logic 715, which performs further operations based on AddF signal 720 and ResumeF signal 725 to generate the input to the flip-flop 705b, adds the value 7 to the number sequence of the LFSR lower portion 700. As illustrated in FIG. 7, evaluates whether the flip-flops 705a-705c have the value 3'b110 (corresponding to the value 6) to generate the AddF signal 720. As further illustrated in FIG. 7, ResumeF logic 735 evaluates whether the flip-flops 705a-705c have the value 3'b111 (corresponding to the value 7) to generate the ResumeF signal 725. That is, the AddF signal 720 asserts when the LFSR lower portion 700 value is 6 and, by operation of how the AddF signal alters the input to the flip-flop 705b, causes the LFSR lower portion to have the value 7 in the next cycle. Similarly, the ResumeF signal 725 asserts when the LFSR lower portion 700 value is 7 and, by operation of how the ResumeF signal alters the input to the flip-flop 705b, causes the LFSR lower portion to have the value 5 in the next clock cycle. Accordingly, a partial sequence of the LFSR lower portion 700, on account of the additional logic 715, is (6, 7, 5). In an embodiment of the disclosed technology, the LFSR lower portion 700 can have a repeating sequence (1, 0, 2, 6, 7, 5, 3, 4).

Figure 8:
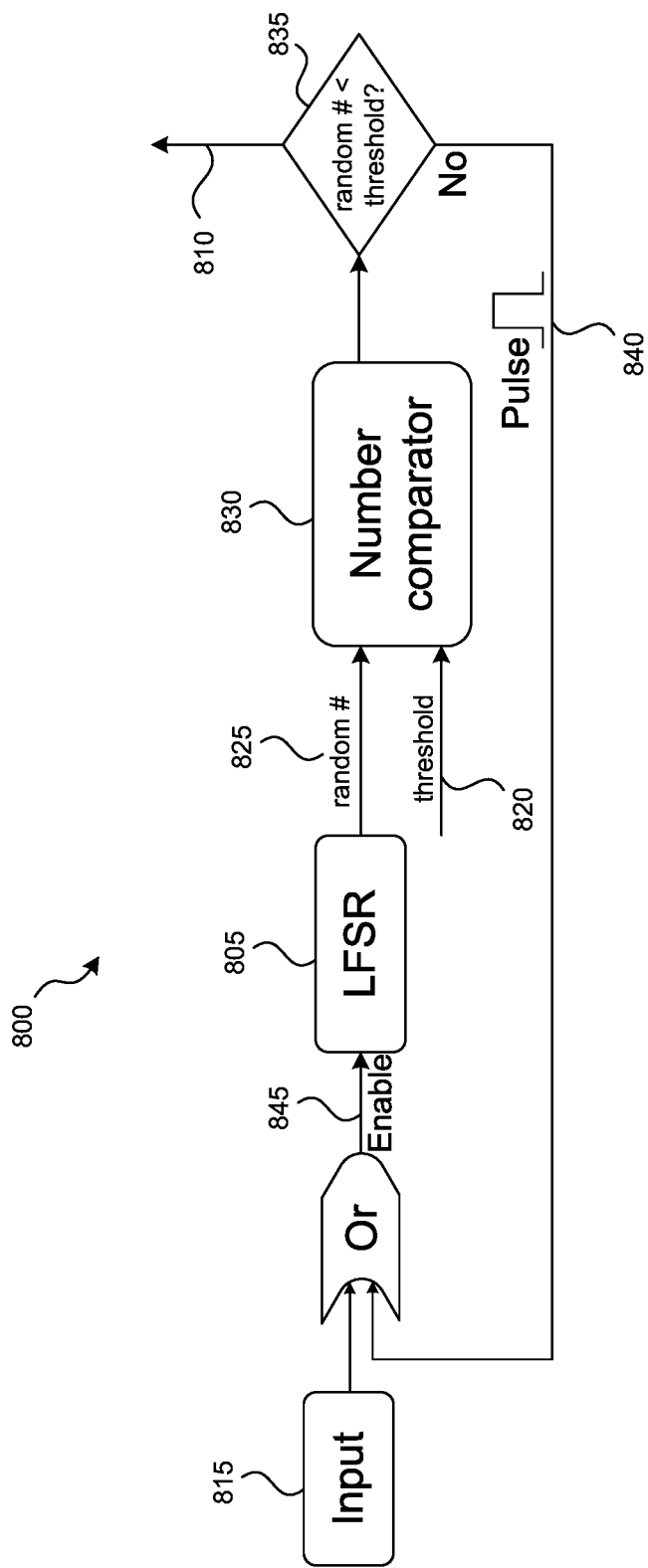
FIG. 8 is a block diagram of a system using bounded random numbers generated by an LFSR in accordance with embodiments of the present technology.

FIG. 8 is a block diagram of a system 800 using bounded random numbers generated by an LFSR 805 in accordance with embodiments of the present technology. As described herein, the system 800 provides a system output 810 following an input indication 815 (at an input terminal) that a bounded random number is needed. In embodiments of the present technology, the system 800 is configured to provide a system output 810 less than a threshold value 820. For example, in embodiments of the present technology, the system output 810 is used as a random address in a system (not shown) for mitigating and/or detecting row hammer effects, and the threshold value 820 represents the maximum allowable address range for the row hammer mitigation/detection system. In embodiments of the present technology, the LFSR 805 is a bounded LFSR as described herein.

To provide the system output 810, the LFSR 805 generates a random number 825 based on the presence of the input indication 815 (e.g., a pulse). In embodiments of the present technology, the LFSR 805 operates on a clock signal (not shown) distinct from the input indication 815, and is enabled in part by the input indication. It will be appreciated that other techniques can be used for operating the LFSR 805 on a clock signal and enabling the LFSR (e.g., enabling state changes) based on different signals (e.g., based on the input indication 815).

The random number 825 generated by the LFSR 805 is compared to the threshold value 820 by a number comparator 830. If the random number 825 is less than the threshold value 820, based on a determination logic 835, then the random number 825 is provided as the system output 810. The system output 810 can include, for example, the random number 825 and a valid signal (not shown). If, however, the random number 825 is not less than the threshold value 820, the determination logic 835 generates a pulse signal 840. The pulse signal 840, in combination with the input indication 815 (e.g., using a logical OR operation), provides an enable signal 845 to the LFSR 805. In other words, the LFSR 805 is enabled to generate a new random number 825 upon an input indication 815 (e.g., from a circuit requesting a new bounded random number) and will continue to be enabled via the pulse signal 840 until a satisfactory bounded random number is generated and provided as the system output 810. As described herein, a bounded LFSR can be configured to generate random numbers within certain limits, and therefore can advantageously provide a satisfactory (e.g., within limit) random number in a smaller number of bounded LFSR clock cycles. That is, for example, the LFSR 805 can provide a system output 810 before the next input indication 815 arrives.

It should be noted that the methods described above describe possible implementations, and that the operations and the steps may be rearranged or otherwise modified and that other implementations are possible. Furthermore, embodiments from two or more of the methods may be combined.

Although in the foregoing example embodiments, memory modules and devices have been illustrated and described with respect to DRAM devices, embodiments of the present technology may have application to other memory technologies, including SRAM, SDRAM, NAND and/or NOR flash, phase change memory (PCM), magnetic RAM (MRAM), ferroelectric RAM (FeRAM), etc. Moreover, although memory modules have been illustrated and described as dual in-line memory modules (DIMMs) having nine memory devices, embodiments of the disclosure may include more or fewer memory devices, and/or involve other memory module or package formats (e.g., single in-line memory modules (SIMMs), small outline DIMMS (SODIMMs), single in-line pin packages (SIPPs), custom memory packages, etc.).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, n and m as used to characterize the size of an LFSR (e.g., to describe the size of an LFSR output, the number of flip-flops forming the LFSR, and/or the range of values generated by the LFSR) refer to positive integers (e.g., 1, 2, 3, etc.). Additionally, n may be greater than m, such that n–m (as used to characterize the size of an LFSR or LFSR portion) is a positive integer. As additionally used herein, including in the claims, k refers to a non-negative integer or natural numbers (e.g., 0, 1, 2, 3, etc.).

As used herein, including in the claims, the "least significant bit" is the bit position in a binary integer giving the units value; that is, determining whether the number is even or odd. The "least significant bits" are the plurality of bits closest to and including the least significant bit. As additionally used herein, the "most significant bit" is the bit position in a binary integer having the greatest value. The "most significant bits" are the plurality of bits closest to and including the most significant bit.

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

We claim:

1. An n-bit linear-feedback shift register, comprising:
a clock signal;
a lower portion linear-feedback shift register, comprising m flip-flops coupled to the clock signal, the lower portion linear-feedback shift register configured to update a next clock cycle state of the m flip-flops, at a transition from a first level of the clock signal to a second level of the clock signal, based on a lower portion linear function of a current clock cycle state of the m flip-flops;
an upper portion linear-feedback shift register, comprising n-m flip-flops coupled to the clock signal, the upper portion linear-feedback shift register configured to update a next clock cycle state of the n-m flip-flops, at the transition from the first level of the clock signal to the second level of the clock signal, based on an upper portion linear function of a current clock cycle state of the n-m flip-flops,
wherein the upper portion linear-feedback shift register further comprises skip circuitry configured to cause the next clock cycle state of the n-m flip-flops to skip a plurality of k states generated from the upper portion linear function, and
wherein each state corresponds to a value, wherein the plurality of skipped k states correspond to k largest values generated from the upper portion linear function, and wherein the skip circuitry is further configured to cause the next clock cycle state of the n-m flip-flops to update to a jump value, wherein the jump value is based on a value less than the k largest values; and
an output of the n-bit linear-feedback shift register comprising a plurality of bits, the plurality of bits numbered from a least significant bit to a most significant bit,
wherein one or more most significant bits of the output of the n-bit linear-feedback shift register are based on the current clock cycle state of the n-m flip-flops of the upper portion linear-feedback shift register, and one or more least significant bits of the output of the n-bit linear-feedback shift register are based on the current clock cycle state of the m flip-flops of the lower portion linear-feedback shift register.

2. The n-bit linear-feedback shift register of claim 1, wherein updating the next clock cycle state of the n-m flip-flops of the upper portion linear-feedback shift register does not depend on the current clock cycle state of the m flip-flops of the lower portion linear-feedback shift register.

3. The n-bit linear-feedback shift register of claim 1, wherein updating the next clock cycle state of the m flip-flops of the lower portion linear-feedback shift register does not depend on the current clock cycle state of the n-m flip-flops of the upper portion linear-feedback shift register.

4. The n-bit linear-feedback shift register of claim 1, wherein the m flip-flops of the lower portion linear-feedback shift register repeatedly sequence through $2^m$ states based on the lower portion linear function.

5. The n-bit linear-feedback shift register of claim 4, wherein the $2^m$ states correspond to values 0 through $2^m-1$.

6. The n-bit linear-feedback shift register of claim 4, wherein the lower portion linear-feedback shift register further comprises add circuitry configured to cause the next clock cycle state of the m flip-flops to store a state corresponding to a value of $2^m-1$.

7. The n-bit linear-feedback shift register of claim 1, wherein the n-m flip-flops of the upper portion linear-feedback shift register repeatedly sequence through $2^{n-m}-1$ states based on the upper portion linear function.

8. The n-bit linear-feedback shift register of claim 7, wherein the $2^{n-m}-1$ states correspond to values 0 through $2^{n-m}-2$.

9. The n-bit linear-feedback shift register of claim 1, wherein the n-m flip-flops of the upper portion linear-feedback shift register repeatedly sequence through $2^{n-m}-1-k$ states based on the upper portion linear function and the skip circuitry.

10. The n-bit linear-feedback shift register of claim 9, wherein the $2^{n-m}-1-k$ states correspond to values 0 through $2^{n-m}-2-k$.

11. The n-bit linear-feedback shift register of claim 1, wherein n, m, and k are configured such that $2^{n-m}-1-k$ shares no common divisor with $2^m$.

12. The n-bit linear-feedback shift register of claim 1, wherein the upper portion linear function is implemented in part by an XOR gate coupled to outputs of a first and a second flip-flop, and to an input of third flip-flop, wherein the first, second, and third flip-flops are of the n-m flip-flops of the upper portion linear-feedback shift register.

13. The n-bit linear-feedback shift register of claim 1, wherein the lower portion linear function is implemented in part by an XOR gate coupled to outputs of a first and a second flip-flop, and to an input of a third flip-flop, wherein the first, second, and third flip-flops are of the m flip-flops of the lower portion linear-feedback shift register.

14. The n-bit linear-feedback shift register of claim 1, wherein the lower portion linear function and the upper portion linear function are different linear functions.

15. A method for generating an n-bit bounded pseudorandom number, comprising:
generating, at a first linear-feedback shift register, a first pseudorandom number of m bits and a value between 0 and $2^m-1$ according to a first linear function, wherein m is less than n, and wherein the first linear-feedback shift register generates the first pseudorandom number at a transition from a first level of a clock signal to a second level of the clock signal;
generating, at a second linear-feedback shift register, a second pseudorandom number of n-m bits and a value between 0 and $2^{n-m}-2$ according to a second linear function, and wherein the second linear-feedback shift register generates the second pseudorandom number at the transition from the first level of the clock signal to the second level of the clock signal,
wherein the second linear-feedback shift register further comprises skip circuitry configured to cause a next clock cycle state of the n-m flip-flops to skip a plurality of k states generated from the second linear function, and
wherein each state corresponds to a value, and wherein the plurality of skipped k states correspond to k largest values generated from the second linear function, and wherein the skip circuitry is further configured to cause the next clock cycle state of the n-m flip-flops to update to a jump value, wherein the jump value is based on a value less than the k largest values;
generating the n-bit bounded pseudorandom number based on the first pseudorandom number and the second pseudorandom number, the n-bit bounded pseudorandom number comprising a plurality of bits ordered from a least significant bit to a most significant bit, wherein the first pseudorandom number corresponds to m least significant bits of the n-bit bounded pseudorandom number, and the second pseudorandom number corresponds to n-m most significant bits of the n-bit bounded pseudorandom number; and
generating a random address, coupled to a plurality of memory cells, based on the n-bit bounded pseudorandom number.

16. The method of claim 15, wherein generating the second pseudorandom number comprises excluding k numbers, each of the k numbers having a value between 0 and $2^{n-m}-2$.

* * * * *